(12) United States Patent
Traywick et al.

(10) Patent No.: US 12,556,577 B2
(45) Date of Patent: Feb. 17, 2026

(54) COMMUNICATION POLICY COMPLIANCE EVALUATOR

(71) Applicant: Bank of America Corporation, Charlotte, NC (US)

(72) Inventors: Edward Lee Traywick, Bellbrook, OH (US); Nicholas O'Reilly, Dallas, TX (US); Laura Stillman Lavender, Washington, DC (US); Joshua Johnson, Denver, NC (US)

(73) Assignee: Bank of America Corporation, Charlotte, NC (US)

( * ) Notice: Subject to any disclaimer, the term of this patent is extended or adjusted under 35 U.S.C. 154(b) by 65 days.

(21) Appl. No.: 18/594,148

(22) Filed: Mar. 4, 2024

(65) Prior Publication Data

US 2025/0280037 A1    Sep. 4, 2025

(51) Int. Cl.
*H04L 9/40*    (2022.01)

(52) U.S. Cl.
CPC ................ *H04L 63/1483* (2013.01)

(58) Field of Classification Search
None
See application file for complete search history.

(56) References Cited

U.S. PATENT DOCUMENTS

| | | | |
|---|---|---|---|
| 8,161,112 B2 | 4/2012 | Bodin et al. | |
| 8,924,497 B2 | 12/2014 | Sheridan et al. | |
| 11,743,362 B1* | 8/2023 | Dhandhania | H04L 67/60 709/245 |
| 2008/0126344 A1* | 5/2008 | Hoffman | G06Q 10/107 707/999.005 |
| 2016/0182479 A1* | 6/2016 | Kaplan | H04L 63/0876 726/6 |
| 2018/0260615 A1* | 9/2018 | Chauhan | G06T 7/73 |
| 2020/0280530 A1* | 9/2020 | Kessler | H04L 47/50 |
| 2020/0311790 A1* | 10/2020 | Keren | G06Q 20/4016 |
| 2022/0360596 A1* | 11/2022 | Varnavas | H04L 63/1416 |
| 2023/0336571 A1* | 10/2023 | Costa | H04L 63/1416 |

\* cited by examiner

*Primary Examiner* — Kaveh Abrishamkar
(74) *Attorney, Agent, or Firm* — Banner & Witcoff, Ltd.

(57) ABSTRACT

The disclosure relates to business communication policy compliance. A communication policy compliance evaluator prevents account creation using business emails not authorized to create such accounts by the business domain email owner. The system assists in preventing phishing attacks as users must use personal email addresses for their non-business account creations.

20 Claims, 3 Drawing Sheets

COMMUNICATION POLICY COMPLIANCE EVALUATOR

FIELD

Aspects of the disclosure relate to computers, networking, hardware, and software. In particular, one or more aspects of the disclosure relate to business email policy compliance.

BACKGROUND

Companies and organizations have communication policies in place to protect company networks from computer viruses and malware. Currently, companies and organizations use existing scanning tools to identify potential unauthorized or malicious emails. For example, companies routinely use a variety of algorithms to analyze and categorize incoming emails to identify spam and phishing emails. In addition, incoming emails from non-business-related companies, websites, and/or services may be flagged for review to determine if business email addresses have been used to create non-business-related accounts. However, current tools are resource-intensive to implement and maintain, ineffective due to increased volume, and time-consuming to resolve flagged detections. In addition, current tools do not prevent the use of business email addresses in the creation of personal accounts.

To protect company resources, many company communication policies restrict the use of company email addresses to only business use. This assists in preventing phishing attacks on users as users must use personal email addresses for their non-business account creation, purchases, services, and subscriptions. Compliance with a business entity's communication policies is needed to reduce potential attacks and reduce phishing emails. A tool is needed to assist with ensuring compliance with communication policies to reduce these increasing threats.

SUMMARY

Aspects of the disclosure provide effective, efficient, scalable, and convenient technical solutions that address and overcome the technical problems associated with the creation of unauthorized account creation using business email addresses.

In accordance with one or more embodiments, a communication policy compliance evaluator prevents account creation using business emails not authorized to create such accounts by the business email domain owner.

In accordance with one or more embodiments, a computing device having at least one processor and memory may determine an email domain based on the received email address. The computing device may transmit to an institution identity authority server a request for permissions and restrictions associated with the email address for use in the account creation request. Subsequently, the computing device may receive permissions and restrictions associated with the email address. The permissions and restrictions may include an indication of whether the email address may be used in account creation.

In an embodiment, responsive to an indication that the email address may be used in account creation the computing device may transmit approval of the account creation request using the email address for use in account creation.

In another embodiment, responsive to an indication that the email address may not be used in account creation the computing device may transmit a denial of the account creation request using the email for use in account creation.

In yet another embodiment, the computing device may determine a security risk level based on the email domain and the denial of the account creation request and transmit to an email domain owner information related to the determined security risk level and the information regarding the denial of the account creation request.

These features, along with many others, are discussed in greater detail below.

BRIEF DESCRIPTION OF THE DRAWINGS

The present disclosure is illustrated by way of example and not limited to the accompanying figures in which like reference numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired, or wireless, and that the specification is not intended to be limiting in this respect.

Some aspects of the present disclosure describe identifying and preventing business emails from being associated with personal account creation against existing business communication policies.

Figure 1A:
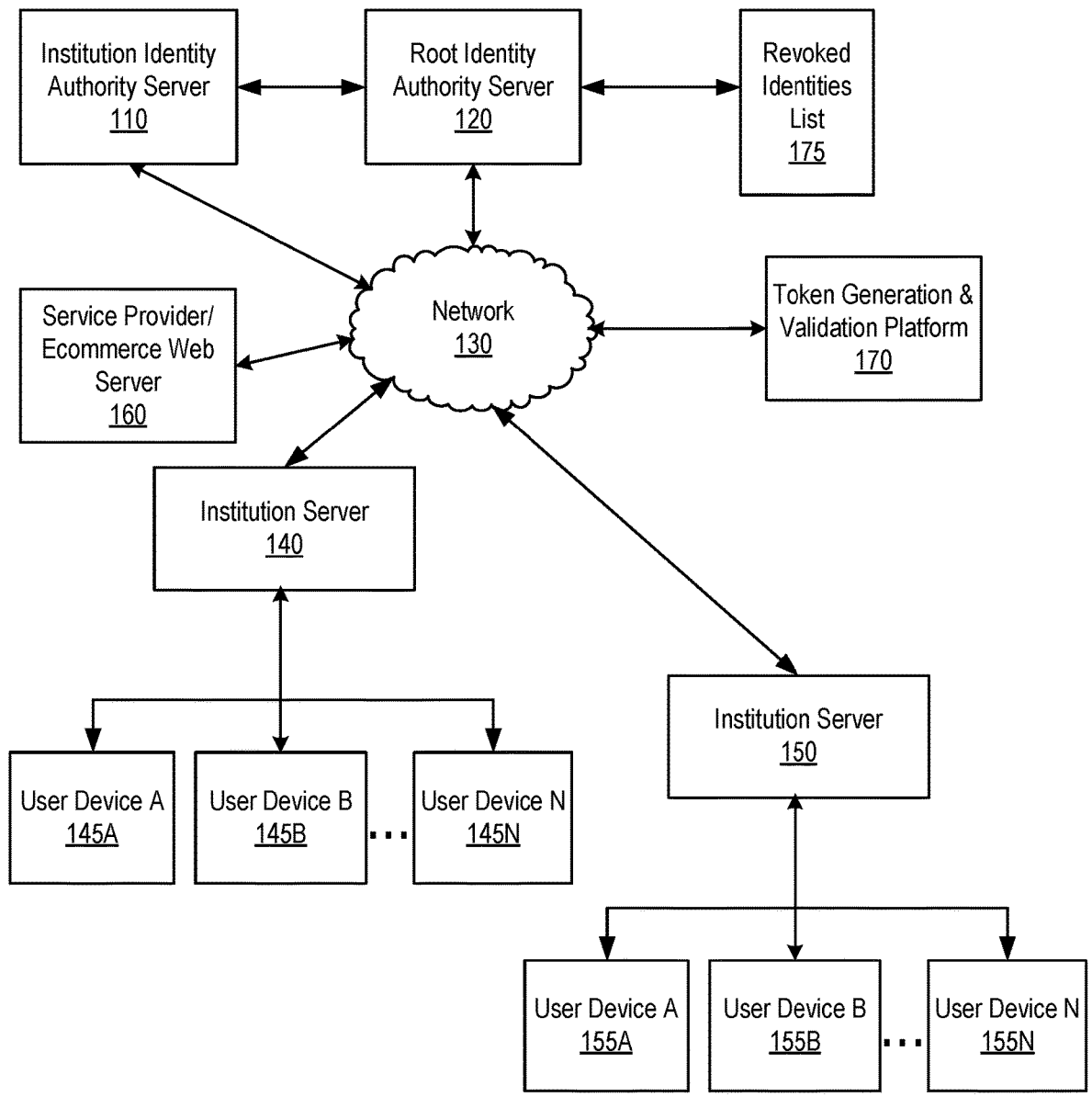
FIGS. 1A and 1B depict an illustrative computing environment for preventing account creation with unauthorized business email addresses in accordance with one or more example embodiments.
Figure 1B:
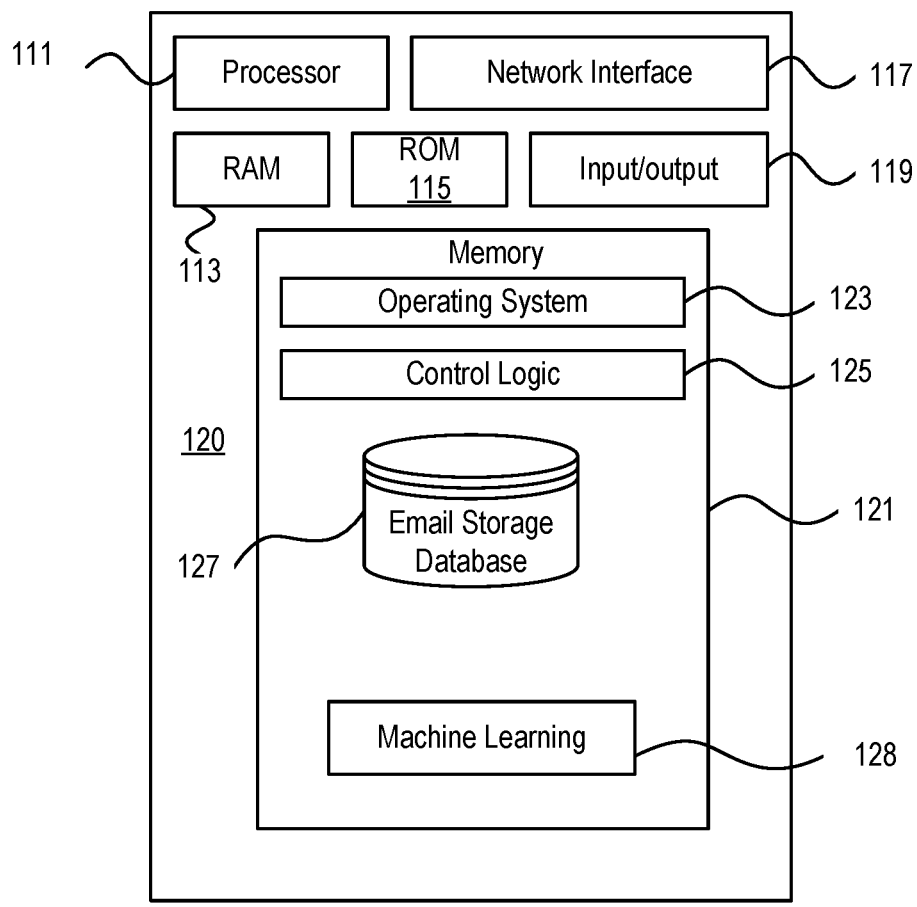

FIGS. 1A and 1B depict an illustrative computing environment for preventing business emails from being associated with personal account creation based on email domains in accordance with one or more example embodiments. Referring to FIG. 1A, a computing environment 100 may include one or more computing devices, servers, and platforms. For example, computing environment 100 may comprise an institution identity authority server 110, a root identity authority server 120, institution servers 140 and 150, user devices 145A-145N, user devices 155A-155N, and a service provider/e-commerce server 160.

Computing environment 100 also may include one or more networks 130, which may interconnect one or more of in an institution identity authority server 110, a root identity authority server 120, institution servers 140 and 150, user devices 145A-145N, user devices 155A-155N, service provider/e-commerce server 160 and/or one or more other systems which may be associated with institution identify authority server 110, with one or more other systems, public networks, sub-networks, and/or the like. The one or more networks 130 may be the Internet. Other networks, including private intranets, corporate networks, local area networks (LAN), wide area networks (WAN), metropolitan area networks (MAN), wireless networks, and personal networks (PAN), may also or alternatively be used or connected to network 130. For example, institution servers 140 and 150 may connect with user devices 145A-145N and 155A-155N via one or more corporate networks or local area networks (LAN).

Institution identity authority server 110 may comprise one or more computing devices and/or other computer components (e.g., processors, memories, communication interfaces). In an embodiment, institution identity authority server 110 may be a domain name registrar server that relates to one or more of domain.com, namecheap.com, or whois.net. Institution Identity Authority Server 110 may be managed by one or more companies. In some instances, institution identity authority server 110 may be associated with particular types of institutions. For example, institution identity authority server 110 may be associated with financial institutions.

Institution identity authority server 110 may also communicate with or exchange information with the DNS. Institution identity authority server 110 may be responsible for the registration and transfer of domain names. Institution identity authority server 110 may be managed and/or supervised by the Internet Corporation for Assigned Names and Numbers (ICANN). For example, ICANN may assign a set of domain names to institution identity authority server 110. Receiving email server 140 may query and obtain the registration dates of the email domains from institution identity authority server 110 or through ICANN (e.g., ICANN lookup). As illustrated in greater detail below, receiving email server 140 may query or otherwise exchange information with one or more domain name registrar servers (e.g., institution identity authority server 110) for one or more registration dates of incoming email domains.

Institution servers 140 and/or 150 may comprise one or more computing devices and/or other computer components (e.g., processors, memories, communication interfaces). Institution server 140 and be associated with a first institution or company. Institution server 150 may be associated with a second institution or second company. Both institution servers 140 and/or 150 may register (e.g., purchase) domain names for setting up one or numerous email accounts that use the registered domain name.). In addition, institution servers 140 and/or 150 may also be configured to determine the security risk of the incoming emails and perform corresponding actions based on the security risk of the incoming emails.

Root identity authority server 120 may comprise one or more computing devices and/or other computer components (e.g., processors, memories, communication interfaces). Root identity authority server 120 may receive requests to determine if submitted email addresses may be eligible for potential use in account creation based on rules governing the use of business email addresses and their associated domains. For instance, root identity authority server 120 may have stored in memory communication policy compliance details for various domain owners. The communication policies may determine which business email accounts associated with a domain are eligible for account creation.

Root identity authority server 120 may communicate with institution identity authority server 110. In an aspect of the disclosure root identity authority server 120, may analyze the communication policies with machine learning to determine permissions for business email addresses associated with domains. In an embodiment, institution identity authority server 110 may receive from institution servers 140 and 150 the business email addresses of their users and the permissions/restrictions for use on each of their use business email addresses. For instance, the information associated with each business email address may include permissions/restrictions for account creation with entities approved by the email address domain name owner. Permissions may be categorized or assigned individually by domain name owners.

Root identity authority server 120 may also generate a revoked identities list 175. The revoked identities list may include email addresses and alias email addresses. In an embodiment, alias email addresses may have different permissions/restrictions as determined by the email domain owner. In some embodiments, the information stored in memory 121 may be stored in a single database, or separated into different logical, virtual, or physical databases, depending on system design.

In another embodiment, root identity authority server 120, may directly contact business institutions to determine if particular business email addresses may be used for external account creation by e-commerce or service providers. In an embodiment, each business institution or organization may have a central location for root identity authority server 120 to query for business email addresses and their associated permissions/restrictions determined and set by the domain owner. In another embodiment, account creation software may be automatically programmed to query and verify any determined business email address permissions/restrictions criteria regarding use in account creation as set by the domain owner. The permission/restriction may be maintained in a ledger by each business entity or centrally maintained as discussed above with respect to root identity authority server 120.

Token generation and validation platform 170 may be a computer platform that includes one or more computing devices (e.g., servers, server blades, or the like) and/or other computer components (e.g., processors, memories, communication interfaces) that may be used to generate, inject, validate, and/or otherwise create authentication and permission tokens and associate the tokens with emails addresses that may be used in the process of account creation. In an embodiment, the token generation and validation platform 170 may, after receiving information from root identity authority server 120, generate an identifier token to be associated with the email address.

Token generation and validation database may store information used by token generation and validation platform 170 in the application of advanced techniques to generate tokens, validate tokens, and/or perform other functions. A machine engine may comprise or otherwise be used by the token generation and validation platform 170 to identify validation patterns, and/or to iteratively refine and/or otherwise optimize datasets and/or algorithms that may be used to provide such automated email address verification.

In an aspect of the disclosure, token generation and validation platform 170 may generate an alpha-numeric code that may be associated with the email address. In some instances, the token generation and validation platform 170 may generate the authentication mechanism in an automated and random manner.

In another aspect of the disclosure, a certificate schema may be associated with email addresses that may be used in the process of account creation. In one embodiment, the certificate schema may be used in conjunction with x509 certificates used for websites. The certificate schema for email addresses permission/restriction may include certificate of authority information, assigning entity, public/private keys, digital signatures, validity period, and organization name.

User devices 145A-145N and/or 155A-155N may include one or more computing devices and/or other computer components (e.g., processors, memories, communication interfaces). For example, one or more user devices 145A-145N and/or 155A-155N may be a mobile computing device (e.g., smartphone, tablet, smart watch, laptop computer, or the like) or desktop computing device (e.g., desktop computer, terminal, or the like). In addition, one or more user devices 145A-145N and/or 155A-155N may be linked to and/or used by one or more users. One or more user devices 145A-145N and/or 155A-155N may be capable of receiving and/or displaying a user interface, email, or the like, receiving or sending input via the user interface, and communicating the received input to one or more other computing devices. One or more user devices 145A-145N and/or 155A-155N may use the user interface to communicate with administrative server 141 and/or receiving email server 140 via a network. One or more user devices 145A-145N and/or 155A-155N may be able to access one or more applications (e.g., email applications, SaaS applications) provided by receiving email server 140 or cloud server 142.

In one or more arrangements, institution identity authority server 110, root identity authority server 120, institution servers 140 and 150, user devices 145A-145N, and user devices 155A-155N may be any type of computing device capable of receiving and/or displaying a user interface, email, or the like, receiving input via the user interface, and communicating the received input to one or more other computing devices. As noted above, and as illustrated in greater detail below, one or more of an institution identity authority server 110, a root identity authority server 120, institution servers 140 and 150, user devices 145A-145N, and user devices 155A-155N may, in some instances, be special-purpose computing devices configured to perform specific functions.

As illustrated in greater detail below, some aspects of the disclosure may provide technical benefits that are not provided by conventional systems. For example, one or more aspects of the disclosure may easily and accurately identify attempts at account creation using unauthorized business email addresses based on querying and analyzing email domain policies. Such information may be easily obtainable as discussed below in various embodiments of the disclosure. For instance, in an aspect of the disclosure, service provider/e-commerce web server 160 may verify that an email associated with a business domain may be used to open a new account during an account creation process. For example, if a user requests a new streaming service, the streaming provider as part of the account creation process verifies that the associated business email and its domain may be used for account creation. Various other technical benefits may be achieved as well.

Referring to FIG. 1B, root identity authority server 120 may include one or more processor(s) 111, RAM 113, ROM 115, a communication interface 117, an input/output (I/O) module 119 (e.g., mouse, keyboard, display, printer), and memory(s) 121. Communication interface 117 may be a network interface configured to support communication between root identity authority server 120 and one or more networks (e.g., network 130). Memory 121 may include control logic 125 having instructions that when executed by processor 111 cause receiving root identity authority server 120 to perform one or more functions described herein and/or one or more databases to store and/or otherwise maintain information that may be used by such program modules and/or processor 111. The functionality of root identity authority server 120 may refer to operations or decisions made automatically based on rules coded into control logic 125, made manually by a user (e.g., an administrator) providing input into the system, and/or a combination of automatic processing and user input. The various hardware memory units in memory 121 may include volatile and nonvolatile, removable, and non-removable media implemented in any method or technology for storage of information such as computer-readable instructions, data structures, program modules, or other data.

In some instances, one or more program modules and/or databases may be stored by and/or maintained in different memory units of data access root identity authority server 120 and/or by different computing devices that may form and/or otherwise make up root identity authority server 120. For example, memory 121 may comprise an operating system 123, control logic 125, and one or more email address storage databases 127. The operating system 123 may control the overall operation of root identity authority server 120. One or more email address storage databases 127 may store information related to identities and their associated email addresses. The information associated with each email address may include permissions for account creation with entities approved by the email address domain name owner. Permissions may be categorized or assigned individually by domain name owners. Permissions may be updated frequently or on a scheduled interval based on domain name owner preferences.

Figure 2:
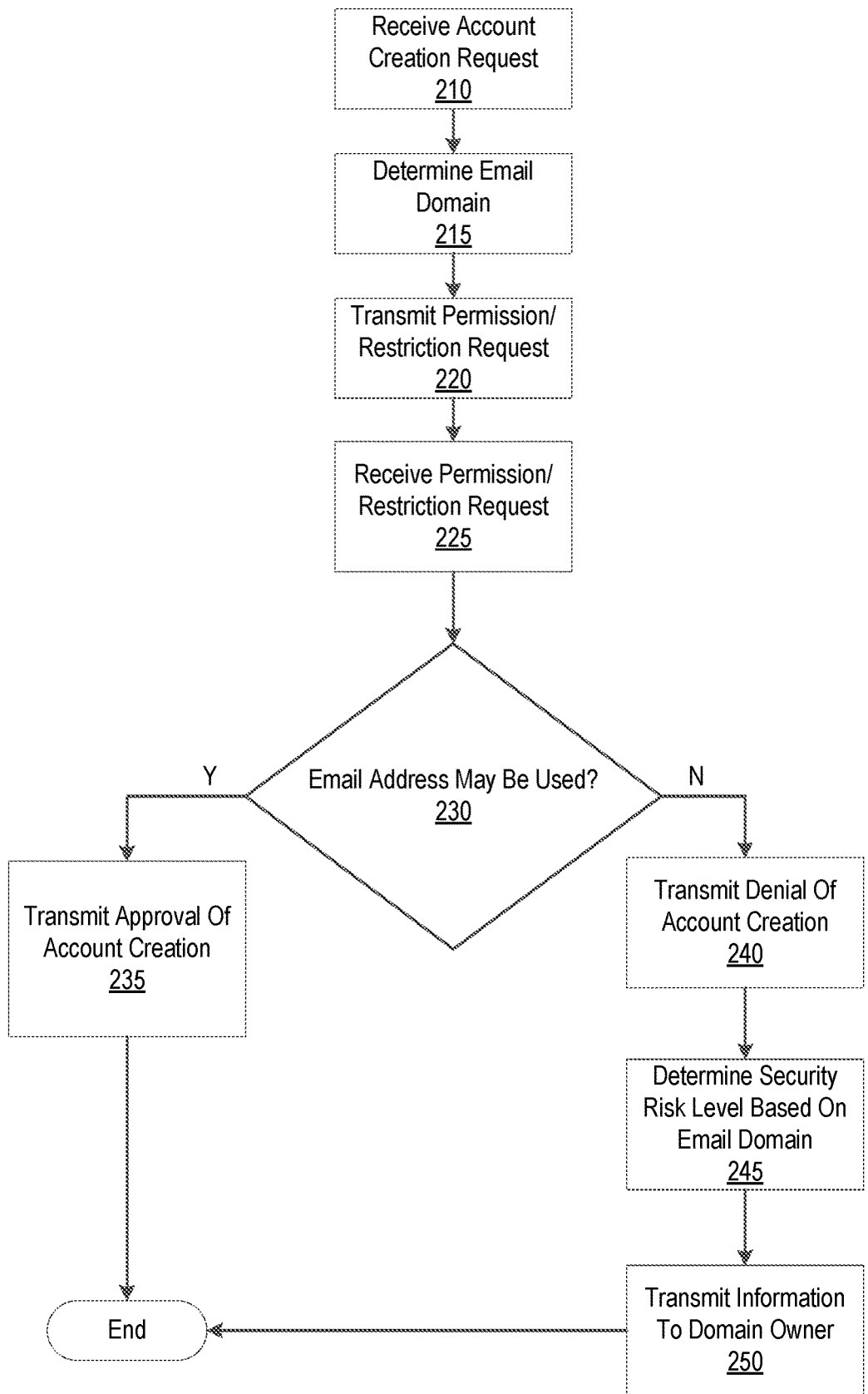
FIG. 2 depicts an illustrative method of preventing account creation with unauthorized business email addresses in accordance with one or more example embodiments.

FIG. 2 depicts an illustrative method of preventing account creation with unauthorized business email addresses in accordance with one or more example embodiments. As shown in step 210, a computing device having at least one processor and memory may receive an account creation request that includes an email address. In step 215, the computing device may determine an email domain based on the received email address. The computing device may in step 220 transmit to an institution identity authority server a request for permissions and restrictions associated with the email address for use in the account creation request. Subsequently in step 225, the computing device may receive permissions and restrictions associated with the email address. The permissions and restrictions may include an indication of whether the email address may be used in account creation.

In an embodiment shown in step 230, responsive to an indication that the email address may be used in account creation the computing device in step 235 may transmit approval of the account creation request using the email address for use in account creation.

In another embodiment, responsive to an indication that the email address may not be used in account creation, as shown in step 240, the computing device may in step 245 transmit a denial of the account creation request using the email for use in account creation.

In step 245, the computing device may determine a security risk level based on the email domain and the denial of the account creation request and transmit to an email domain owner information related to the determined security risk level and the information regarding the denial of the account creation request. In step 250, the computing device may transmit to an email domain owner information related to the determined security risk level and the information regarding the denial of account creation request.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
   receiving, by a computing device having a processor and memory, an account creation request, the account creation request including an email address for use in an account creation;
   determining an email domain based on the received email address;
   transmitting to an institution identity authority server a request for permissions and restrictions associated with the email address for use in the account creation request;
   receiving permissions and restrictions set by an email domain owner associated with the email address, the permissions and restrictions including an indication of whether the email address may be used in account creation;
   responsive to an indication that the email address may be used in account creation, transmitting, by the computing device, approval of the account creation request using the email address for use in account creation;
   responsive to an indication that the email address may not be used in account creation, transmitting, by the computing device, denial of the account creation request using the email for use in account creation;
      determining a security risk level based on the email domain and the denial of the account creation request; and
      transmitting to an email domain owner information related to the determined security risk level and the information regarding the denial of account creation request.

2. The method of claim 1, further comprising:
   adding the email address to a revoked identities list; and
   automatically blocking account creation associated with the added email address.

3. The method of claim 2, further comprising:
   flagging the added email address for further account review; and
   transmitting to the domain owner updates to the revoked identities list.

4. The method of claim 1, wherein receiving an indication that the email address may be used in account creation, further comprises:
   requesting a token generation and validation platform for an identifier token associated with the email address; and
   receiving the generated identifier token from the generation and validation platform.

5. The method of claim 4, wherein transmitting the approval of the account creation request includes transmitting the generated identifier token associated with the email address.

6. The method of claim 1, wherein the permissions and restrictions associated with the email address comprise a categorized list of service providers and e-commerce platforms and associated permissions and restrictions for each category.

7. The method of claim 6, wherein the categorized list comprises streaming service providers.

8. An apparatus, comprising:
   at least one processor;
   memory storing computer-readable instructions that, when executed by the at least one processor, cause the apparatus to:

receive an account creation request, the account creation request including an email address for use in an account creation;

determine an email domain based on the email address that was received;

transmit to an institution identity authority server a request for permissions and restrictions associated with the email address for use in the account creation request;

receive permissions and restrictions set by an email domain owner associated with the email address, the permissions and restrictions including an indication of whether the email address may be used in account creation;

responsive to an indication that the email address may be used in account creation, transmit, by the computing device, approval of the account creation request using the email address for use in account creation;

responsive to an indication that the email address may not be used in account creation, transmitting, by the computing device, denial of the account creation request using the email for use in account creation;

determine a security risk level based on the email domain and the denial of the account creation request; and transmit to an email domain owner information related to the determined security risk level and the information regarding the denial of account creation request.

9. The apparatus of claim 8, wherein the instructions, when executed by the at least one processor, cause the apparatus to:

add the email address to a revoked identities list; and automatically block account creation associated with the added email address.

10. The apparatus of claim 9, wherein the instructions, when executed by the at least one processor, cause the apparatus to:

flag the added email address for further account review; and transmit to the domain owner updates to the revoked identities list.

11. The apparatus of claim 8, wherein the instructions, when executed by the at least one processor, cause the apparatus to:

request a token generation and validation platform for an identifier token associated with the email address; and receive the generated identifier token from the generation and validation platform.

12. The apparatus of claim 11, wherein the instructions, when executed by the at least one processor, cause the apparatus to transmit the generated identifier token associated with the email address with the approval of the account creation request.

13. The apparatus of claim 8, wherein the permissions and restrictions associated with the email address comprise a categorized list of service providers and e-commerce platforms and associated permissions and restrictions for each category.

14. One or more non-transitory computer-readable media storing instructions that, when executed by one or more processors, cause:

receiving an account creation request, the account creation request including an email address for use in an account creation;

determining an email domain based on the received email address;

transmitting to an institution identity authority server a request for permissions and restrictions associated with the email address for use in the account creation request;

receiving permissions and restrictions set by an email domain owner associated with the email address, the permissions and restrictions including an indication of whether the email address may be used in account creation;

responsive to an indication that the email address may be used in account creation, transmitting, by the computing device, approval of the account creation request using the email address for use in account creation;

responsive to an indication that the email address may not be used in account creation, transmitting, by the computing device, denial of the account creation request using the email for use in account creation;

determining a security risk level based on the email domain and the denial of the account creation request; and transmitting to an email domain owner information related to the determined security risk level and the information regarding the denial of account creation request.

15. The one or more non-transitory computer-readable media of claim 14, wherein the instructions, when executed by the one or more processors, further cause:

adding the email address to a revoked identities list; and automatically blocking account creation associated with the added email address.

16. The one or more non-transitory computer-readable media of claim 15, wherein the instructions, when executed by the one or more processors, further cause:

flagging the added email address for further account review; and transmitting to the domain owner updates to the revoked identities list.

17. The one or more non-transitory computer-readable media of claim 14, wherein the instructions, when executed by the one or more processors, further cause:

requesting a token generation and validation platform for an identifier token associated with the email address; and receiving the generated identifier token from the generation and validation platform.

18. The one or more non-transitory computer-readable media of claim 17, wherein transmitting the approval of the account creation request includes transmitting the generated identifier token associated with the email address.

19. The one or more non-transitory computer-readable media of claim 14, the permissions and restrictions associated with the email address comprise a categorized list of service providers and e-commerce platforms and associated permissions and restrictions for each category.

20. The one or more non-transitory computer-readable media of claim 19, wherein the categorized list comprises streaming service providers.

* * * * *